March 1, 1927.    H. S. THOMAS ET AL    1,619,684
MACHINERY EMPLOYED IN THE SHEARING OF METAL PLATES OR SHEETS
Filed Oct. 31, 1924
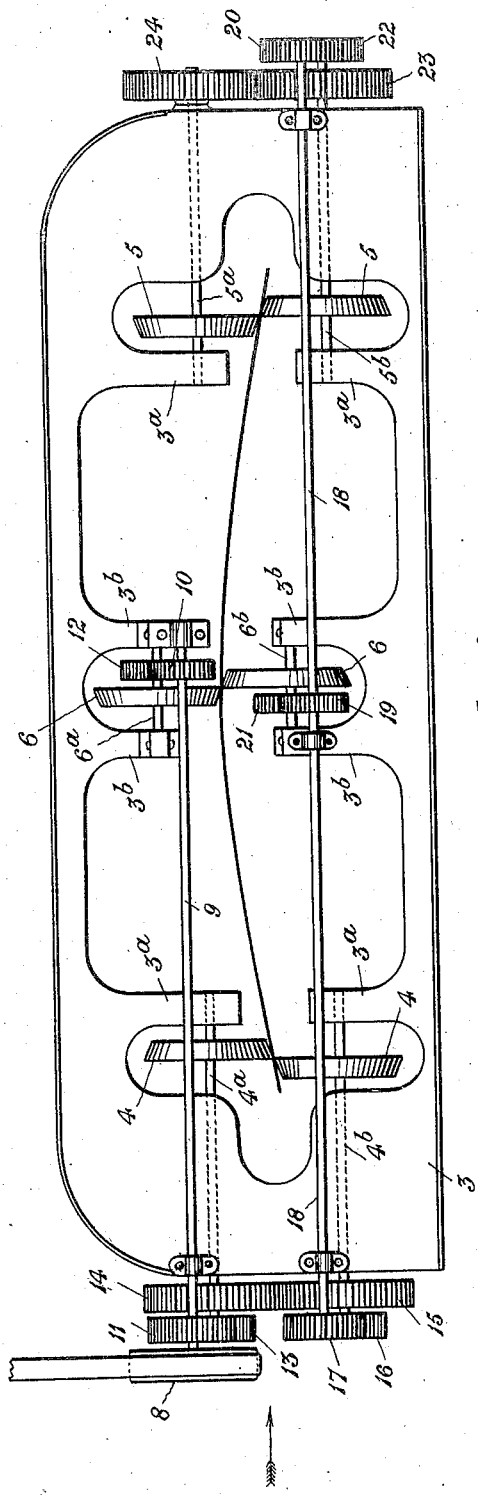
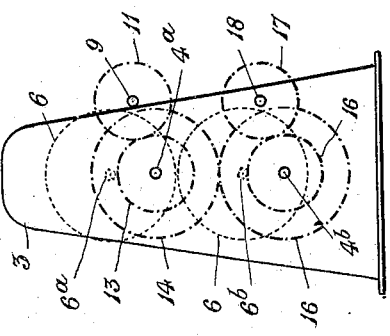
Inventors:—
Hubert S. Thomas
William R. Davies
by George E. Folkes
their Attorney Patented Mar. 1, 1927.

1,619,684

UNITED STATES PATENT OFFICE.

HUBERT SPENCE THOMAS, OF LLANDAFF, AND WILLIAM ROBERT DAVIES, OF WHITCHURCH, WALES.

MACHINERY EMPLOYED IN THE SHEARING OF METAL PLATES OR SHEETS.

Application filed October 31, 1924, Serial No. 747,072, and in Great Britain November 15, 1923.

This invention relates to machinery employed in the shearing of metal plates or sheets and is more especially applicable to machinery to be employed in the trimming and dividing of the thin sheet metal plates or packs of plates which are obtained during the series of rolling operations whereby the thin sheets technically termed in the tin plate industry "black plates" are produced from a piece or bar of metal.

In order that the invention may be the better understood we remark that when the plates or packs of plates have cooled down after the rolling operations they do not assume a flat plane but have a slightly arched or convex formation, that is to say, are cambered both in the direction of their length and breadth, and consequently the trimming and dividing of the plates presents some difficulty and is usually performed by a succession of shearing operations in the device technically known as "crocodile shears".

This invention has for its object to expedite the shearing operations for trimming and dividing the sheets and the invention consists in the provision of a shearing machine employing a series of pairs of rotary disc cutters and wherein the pair of disc cutters, or more than one pair of disc cutters if desired, arranged intermediate the outer pairs of disc cutters which respectively effect the edge shearing or trimming operations, have their centres or axes so displaced vertically relatively to the axes of the said outer pairs of disc cutters that the camber or curvature of the sheet is compensated for, and the acting edge or shear point of the pair of pairs of intermediate cutters are in or practically in the plane or at the level of the curved sheet at the line along which the shear is to be effected.

Preferably the series of pairs of rotary cutter discs are mounted in a common standard or framing suitably gapped to permit the passage of the sheet therethrough and to accommodate the pairs of rotary disc cutters.

The series of cutter discs are power driven by a convenient driving mechanism where the machine is provided with two outer pairs of cutter discs and one intermediate pair as in the machine illustrated in the accompanying drawing being hereinafter more particularly described.

Referring now to the said drawing, Figure 1 represents in front elevation and Figure 2 in end elevation, looking in the direction of the arrow in Figure 1, a shearing machine in accordance with the invention both of the said figures being more or less diagrammatic, a plate under operation in the machine being seen in edge view in Figure 1.

The same numerals of reference indicate the same parts in both figures of the drawing, 3 denoting the standard or framing of the machine which framing is suitably gapped intermediate its ends to accommodate the series of pairs of cutter discs 4, 5 and 6 and also to permit the passage of the plate or sheet 7 through the framing while the said plate makes its traversing motion for the operation of the cutters thereon.

The pairs of cutters 4 and 5 are adapted to trim the respective side edges of the plate or sheet 7 and the axes $4^a$ and $5^a$ $4^b$ and $5^b$ of the upper and lower cutters respectively of each pair of cutters are preferably in alignment, the said axes being suitably journaled in bearings carried by the framing 3 the gapped portion of which has inwardly extending parts $3^a$ in or on which the bearings for the inner ends of the axes are arranged.

The upper and lower cutters of the pair of cutters 6 intermediate the pairs 4 and 5 have their axes $6^a$ and $6^b$ displaced from the respective horizontal planes of the axes of the upper and lower cutters of the outer pairs to an extent sufficient to compensate for the curvature or camber of the sheet 7 and the said axes are journaled in bearings arranged in or on the inwardly extending parts $3^b$ of the framing 3. Preferably the direction of the displacement of the axes $6^a$ and $6^b$ is upward as shown in the drawing but it may be downward if desired with the same or nearly the same effect in which case the sheet 7 would be fed through the machine with its curvature reversed, that is to say, its middle line would lie in a lower plane than its side edges.

The pairs of cutters described are power driven convenient driving mechanism comprising the belt driven pulley 8, omitted in Figure 2, which pulley is arranged on one end of the shaft 9 having thereon a pair of spur pinions 10, 11, the pinion 10 gearing with and driving a spur wheel 12 on the axis or spindle $6^a$ of the upper cutter disc of the intermediate pair of cutters 6. The other spur pinion 11 is in mesh with and drives a spur wheel 13 on the shaft or spindle 4ª on which is mounted the upper cutter disc of the outer pair of cutters 4 adjacent the end at which the drive is arranged. In mesh with a second spur wheel 14 on the outer cutter spindle 4ª is a spur wheel 15 on the shaft or spindle 4ᵇ of the co-acting lower cutter disc, the said shaft or spindle of the lower cutter disc having thereon a second spur wheel 16 which meshes with a pinion 17 on a shaft 18 extending across the full length of the machine and having thereon the pinions 19 and 20 the pinion 19 being suitably placed to mesh with and drive a spur wheel 21 on the axis 6ᵇ of the lower disc cutter of the intermediate pair of cutters 6 and the pinion 20 which is at or near the end of the shaft 18 remote from the end at which the machine is driven being in mesh with a spur wheel 22 on the shaft or spindle 5ᵇ of the lower cutter disc of the pair of cutters 5. On the said axis or spindle 5ᵇ of this lower cutter disc is a second spur wheel 23 which is in mesh with a similar spur wheel 24 on the axis or spindle 5ª of the co-acting upper cutter disc, and the mechanism described effects the requisite rotation of the series of upper disc cutters in one direction and the lower co-acting disc cutters in the opposite direction, and in synchrony.

We wish it however to be understood that we do not limit ourselves to the precise arrangement of driving mechanism described as the same may be varied without departing from the invention, for example, each disc may be driven by a separate chain from shafts running the full length of the machine.

Provision may be made for effecting a raising or lowering adjustment of the cutter discs 6 to compensate for plates having variable curvatures and also for temporarily taking out of operation any pair of disc cutters which may not be required to act on the plate.

In order to facilitate shearing operations on the sheet or pack of sheets in directions at right angles to one another two machines such as are hereinbefore described are preferably provided to co-operate in the trimming and/or dividing of the sheets, one machine being arranged in the mill in a direction at right angles to the other the said machines having combined therewith chain, roller or like conveyors adapted to transfer the sheet or pack of sheets from the first machine and convey it travelling in a direction at right angles to that at which it leaves the first machine, to the second machine.

Although the shearing machinery described is particularly applicable to the tinplate industry we wish it to be understood that it may be applied in other industries where the plates or sheets to be operated on have the arched or cambered formation hereinbefore referred to.

Claims:—

1. Machines for use in the shearing of metal plates and sheets comprising a plurality of pairs of rotary disc cutters the contiguous portions of the cutting edges of the intermediate pairs of which are disposed in different horizontal planes to those containing the corresponding contiguous portions of the cutting edges of the outer pairs of cutters and means for rotating and synchronizing the operation of said cutters.

2. Machines for use in the shearing of metal plates and sheets comprising a framing, a plurality of pairs of disc cutters rotatably mounted within said framing the contiguous portions of the cutting edges of the intermediate pairs of cutters being disposed in different horizontal planes to those containing the corresponding contiguous portions of the cutting edges of the outer pairs of cutters, means for effecting the rotation of said cutters and means for synchronizing the operation of the cutters.

3. Machines for use in the shearing of metal plates and sheets comprising a framing, bearings carried by said framing, spindles rotatably mounted in said bearings, a plurality of pairs of rotary disc cutters mounted on said spindles the contiguous portions of the cutting edges of the intermediate pairs of cutters being in different horizontal planes to the horizontal planes containing the corresponding contiguous portions of the cutting edges of the outer pairs of cutters, gearing for interconnecting and synchronizing the operation of said cutters and means for driving said gearing.

In testimony whereof we have signed our names to this specification.

HUBERT SPENCE THOMAS.
WILLIAM ROBERT DAVIES.